US006619827B2

(12) United States Patent
Uchida

(10) Patent No.: US 6,619,827 B2
(45) Date of Patent: Sep. 16, 2003

(54) VEHICLE HEADLAMP

(75) Inventor: Naoki Uchida, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/011,767

(22) Filed: Dec. 11, 2001

(65) Prior Publication Data

US 2002/0085388 A1 Jul. 4, 2002

Related U.S. Application Data

(60) Provisional application No. 60/318,633, filed on Sep. 13, 2001.

(30) Foreign Application Priority Data

Dec. 18, 2000 (JP) .................................... P2000-383533

(51) Int. Cl.[7] ................................................ B60Q 1/00

(52) U.S. Cl. ....................... 362/539; 362/538; 362/509; 362/503; 362/305; 362/494

(58) Field of Search ................................ 362/539, 538, 362/509, 503, 305, 494

(56) References Cited

U.S. PATENT DOCUMENTS

| | | | | |
|---|---|---|---|---|
| 5,055,981 A | * | 10/1991 | Nino | 362/539 |
| 5,130,900 A | | 7/1992 | Makita | |
| 5,169,224 A | * | 12/1992 | Segoshi et al. | 362/539 |
| 5,285,358 A | | 2/1994 | Watanabe et al. | |
| 5,422,793 A | | 6/1995 | Kobayashi | |
| 5,430,623 A | | 7/1995 | Uchida | |
| 6,312,147 B2 | * | 11/2001 | Eichler | 362/539 |
| 6,428,194 B1 | * | 8/2002 | Oschmann et al. | 362/507 |

FOREIGN PATENT DOCUMENTS

| | | | | |
|---|---|---|---|---|
| EP | 0 003 940 A1 | | 9/1979 | |
| FR | 0003940 | * | 1/1978 | F21M/3/14 |
| FR | 2531518 | | 2/1984 | |

* cited by examiner

*Primary Examiner*—Sandra O'Shea
*Assistant Examiner*—Bertrand Zeade
(74) *Attorney, Agent, or Firm*—Sughrue Mion, PLLC

(57) ABSTRACT

A headlamp arrangement designed and configured to slow light-and-shade changes in a light-and-shade boundary portion of a light distribution. A vehicle headlamp 1 includes a reflector 2 having a substantially spheroidal reflective surface 2*a*, a light source 3 disposed at a first focal position F1 of the reflector, a projection lens 4 that forwardly projects the light reflected from the reflector 2 and that is disposed in front of the light source, a cutline-forming shade 5 whose upper edge 5*a* is disposed substantially at the focal position f of the projection lens, and a dimmer shade 6 whose front end portion 6*a* is positioned closer to the reflective surface than it is to the second focal point F2 of the reflector. The dimmer shade is disposed above the optical axis x—x of the reflector.

5 Claims, 3 Drawing Sheets

VEHICLE HEADLAMP

Priority is claimed based on U.S. provisional patent application Serial No. 60/318,633, filed Sep. 13, 2001, which is hereby incorporated by reference in its entirety.

BACKGROUND OF THE INVENTION

The present invention relates to a novel vehicle headlamp and, more particularly, to the art of canceling an extreme light-and-shade difference in a light-and-shade boundary portion produced by a headlamp.

There is a prior-art vehicle headlamp or projector type headlamp, comprising a reflector having a substantially spheroidal reflective surface, a light source disposed at the first focal position of the reflector, a projection lens disposed in front of the light source and used for projecting forward the light of the light source reflected from the reflector, and a cutline-forming shade whose upper edge is substantially disposed in the focal position of the projection lens.

With respect to the reflector having the spheroidal reflective surface, reflected light having a considerably large angle with the optical axis is emitted from the reflector—when the surface perpendicular to the optical axis including the second focal point, that is, the surface extending up to the vicinity of the focal surface, is used as the reflective surface. As the light directed upward is shaded by the cutline-forming shade, no problem arises. However, the light emitted downward subsequently is reflected upward by a member, such as a bumper, positioned close to the headlamp. Such light then is either subjected—by dust in the air—to irregular reflection, or reflected from drops of rain, which produces an optical film phenomenon developing a problem of glare that results in a driving impediment.

Therefore, an attempt has been made to provide a dimming shade for the purpose of cutting the downwardly emitted light (from the reflector) that is subject to upward reflection by the bumper, and this has contributed to obviating the glare phenomenon in its own way.

However, the conventional vehicle headlamp is arranged so that the downwardly emitted light from the reflector is cut in the vicinity of the second focal point by disposing the front is end portion of the dimming shade in the vicinity of the second focal point of the reflector. Therefore, the cutline sharply emerges and the problem is that an extreme light-and-shade difference arises in the light distribution.

With respect to the upper edge of a low-beam light distribution, the cutline must sharply emerge for the purpose of preventing the driver of any oncoming car from receiving dazzling light. However, occurrence of such an extreme light-and-shade difference on the lower edge of the light distribution tends to lower the visibility of the driver because of the time lag associated with the change of pupil size when the eye is turned to the dim portion from the bright portion

SUMMARY OF THE INVENTION

An object of the present invention is to slow light-and-shade changes in a light-and-shade boundary portion on the lower edge of the light distribution.

In order to accomplish the above and other objects, a dimmer shade, whose front end portion is positioned closer to a reflective surface of the reflector than it is to the converging point of the reflector, is disposed above the optical axis of the reflector.

Therefore, in the vehicle headlamp according to the invention, emitted light (from the reflector), for forming a light-and-shade boundary portion at the lower end of a light distribution, is cut while the luminous flux density is relatively low. Therefore, variation of irradiation light with respect to variation in the size and shape of the dimmer shade is small, so that delicate adjustment of the irradiation light is easy. As a result, there is reduced risk of lowering a driver's visibility when the driver's eyes are moved between the light and shade portions.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein.

DETAILED DESCRIPTION OF THE PREFERRED EMBODIMENTS

A vehicle headlamp embodying the present invention will now be described by reference to the accompanying drawings.

Figure 1:
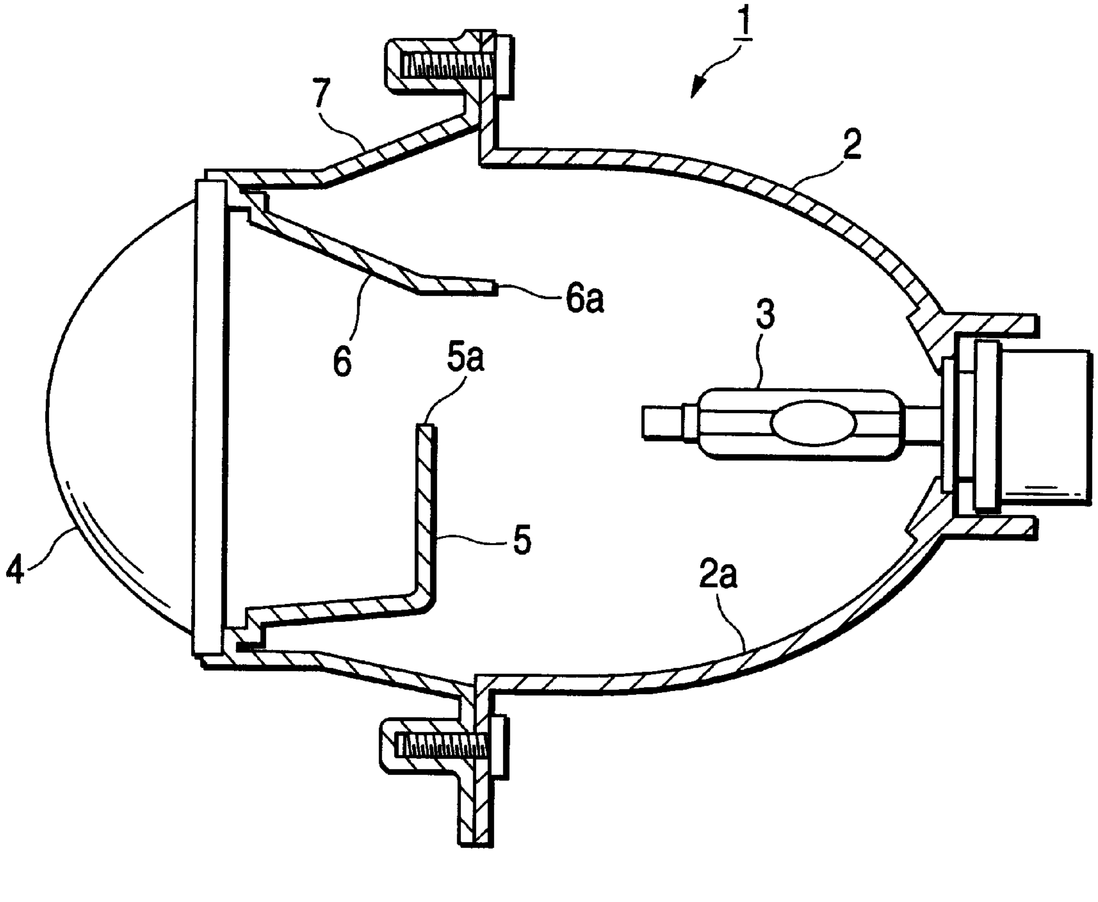
FIG. 1 is a schematic vertical sectional view of a vehicle headlamp embodying the present invention.

A vehicle headlamp 1 of FIG. 1 is used for an automobile in order to emit a low beam, and comprises: a reflector 2; a light source bulb 3 supported by the reflector 2; a projection lens 4 for projecting forward the light reflected from the reflector 2 of the light source bulb 3; a cutline-forming shade 5; and a dimmer shade 6. The cutline-forming shade 5 is for defining the upper edge—that is, the cutline—of a low-beam luminous intensity distribution formed by the light projected by the projection lens 4. The dimmer shade 6 is positioned above the optical axis of the reflector 2, and is used to limit an area of irradiation of the lower edge of the luminous intensity distribution.

The reflector 2 has a substantially spheroidal reflective surface 2*a*. A discharge bulb is employed as the light source bulb 3, and its light emitting portion is positioned at substantially the first focal point F1 of the reflector 2. Therefore, the light of the light source bulb 3—as it is reflected from the reflective surface 2*a* of the reflector 2—is substantially converged at the second focal point F2 of the reflector 2. The light source bulb 3 is not limited to a discharge bulb, but may be any kind of bulb—including an incandescence bulb such as a halogen bulb—as long as predetermined luminous intensity is obtainable.

The projection lens 4 is a convex lens, and is disposed so that its optical axis coincides with the optical axis x—x of the reflector 2 or so that its focal point f is positioned in the vicinity of the second focal point F2.

The projection lens 4 is disposed in front of the reflector 2 by a lens holder 7.

The cutline-forming shade 5 is disposed so that its upper edge 5*a* is positioned in the vicinity of the focal point of the projection lens 4 in the vicinity of the optical axis x—x. Further, the cutline-forming shade 5 is formed integrally with the lens holder 7. Alternatively, the cutline-forming shade 5 may also be monolithically formed with the lens holder 7.

The dimmer shade 6 is formed integrally with the lens holder 7. In one embodiment, the dimmer shade 6 is monolithically provided backward from the lens holder's upper end portion of the front end portion that supports the projection lens 4. Further, the front end portion 6*a* of the dimmer shade 6 is positioned above the optical axis x—x of the reflector 2, and is positioned closer to the reflective surface 2*a* than it is to the second focal point F2 of the reflector 2. Moreover, if possible, the end portion 6*a* is provided in the vicinity of the reflective surface 2*a*, near the open end of the reflector 2.

Figure 2:
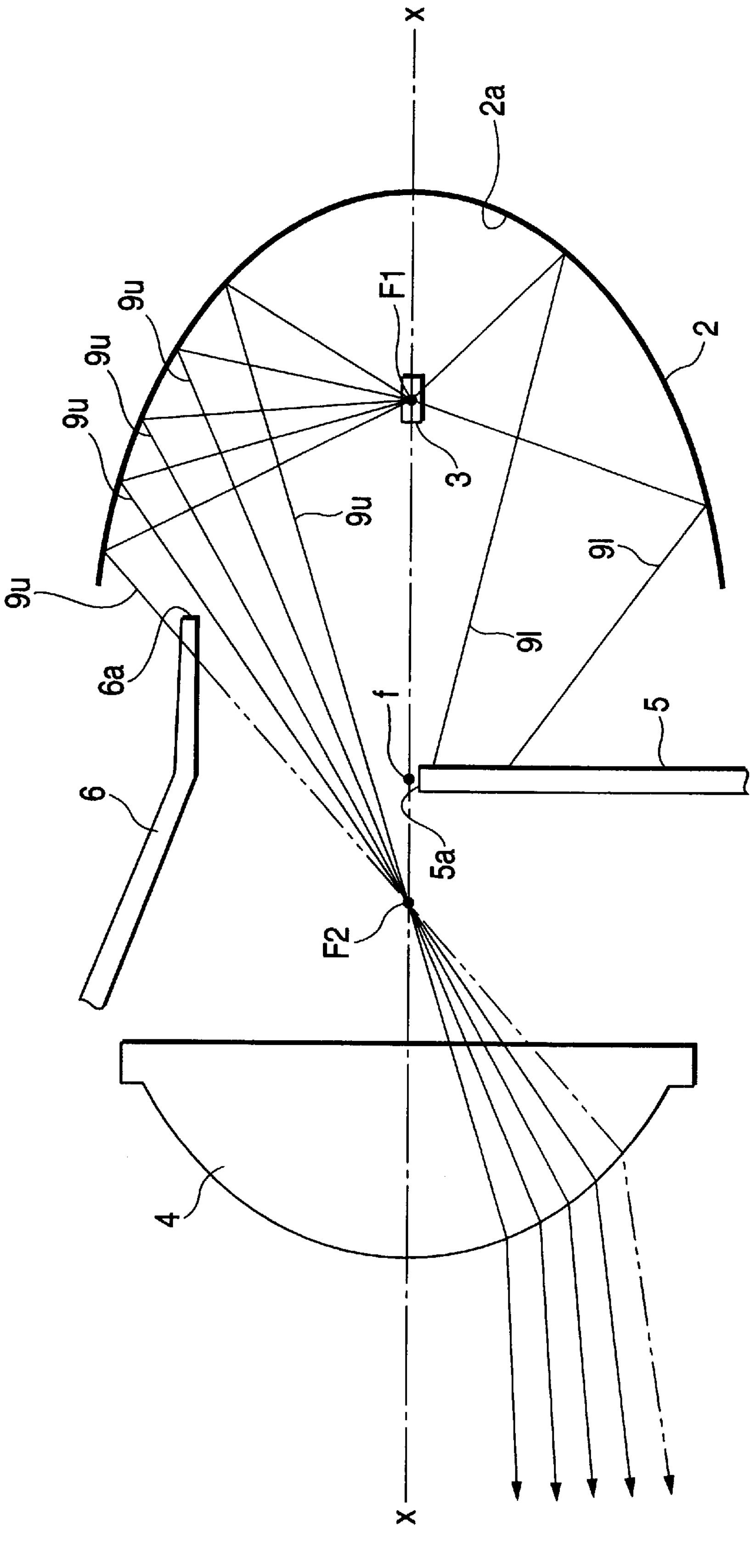
FIG. 2 is schematic diagram of a light trace for explaining the operation.

As shown in FIG. 2, the light of light source bulb 3—whose light emitting portion is substantially positioned at the first focal point F1 of the reflector 2—is reflected from the reflective surface 2*a*, and is converged at the second focal point F2 of the reflector 2 before being diffused forward substantially from the second focal point F2. Of the light from the light source bulb 3, direct light—that is, the light directed forward without being directed to the reflective surface 2*a* of the reflector 2—is shaded by a shade (not shown) and not emitted forward.

Figure 3:
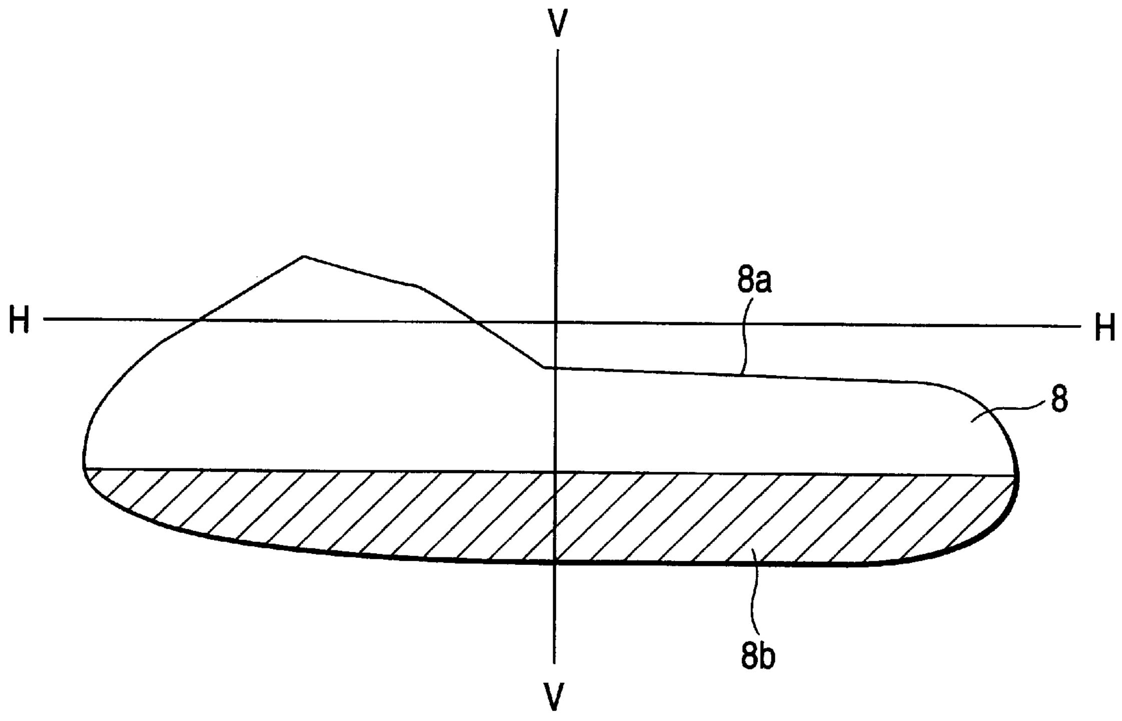
FIG. 3 is schematic diagram of light distribution.

Then, light diffusing from the second focal point F2 is converged by the projection lens 4 and is projected forward, whereby a low-beam luminous intensity distribution 8 is formed as shown in FIG. 3. In FIG. 3, H—H designates a horizontal line, and V—V a vertical line. An intersection line of the horizontal line H—H and the vertical line V—V is positioned on the optical axis x—x of the reflector 2. During the process of emitting light from the light source bulb 3, and projecting the light forward by means of the projection lens 4, most of the light beams 91, 91, . . . (reflected from the lower half portion of the reflective surface 2*a* of the reflector 2) are shaded by the cutline-forming shade 5 and not emitted forward. As the reflected light beams 91, 91, . . . are thus shaded by the shade 5, a cutline 8*a*—forming the upper edge of the luminous intensity distribution 8—is formed. Then, the upper edge 5*a*—positioned in the vicinity of the focal point f of the projection lens 4—causes the cutline 8*a* to sharply appear.

Further, of the light emitted from the light source bulb 3, although most of the light beams 9*u*, 9*u*, . . . (reflected from the upper half portion of the reflective surface 2*a* of the reflector 2) are projected forward, the light reflected in the vicinity of the open edge of the reflector 2 is shaded by the dimmer shade 6 (a chain double-dashed line indicates a provisional light trace after the light is shaded). The light reflected in the vicinity of the open edge of the reflector 2 has a large angle with respect to the optical axis x—x and is equivalent to light that irradiates the foot of the vehicle in which the headlamp is mounted. As the light is thus shaded by the shade 6, it is possible to eliminate so-called glare, or driving impediment, resulting from the optical film phenomenon produced by the light being reflected upward. The light may be reflected upward by a member, such as a bumper, in the vicinity of the headlamp, which light is then either subjected—by dust in the air—to irregular reflection, or reflected from drops of rain. Because the front end portion 6*a*, of the shade 6, is positioned close to the reflective surface 2*a* in such a state that the luminous flux density is relatively low, variation of irradiation light with respect to variation in the size and shape of the dimmer shade 6 is small. Therefore delicate adjustment of the irradiation light is easy. At the same time, the lower light-and-shade boundary line 8*b*—indicated by a speckled belt line and defined by the front end portion 6*a* out of the luminous intensity distribution 8—relatively gently varies, which results in reducing the risk of lowering a driver's visibility when the driver's eyes are moved between the light and shade portions.

Although the reflective surface of the reflector has been set substantially spheroidal according to this embodiment of the invention, the reflective surface required for the invention is not limited to spheroidal. Instead, the reflective surface may be of any shape, provided that it is capable of converging light from a light source to a forward converging point.

The shape and structure of each component part according to the above embodiment of the invention have been shown only by way of example, and it will be understood that the technical range of the invention is in no way restricted.

As is obvious from the description above, the vehicle headlamp according to the invention comprises the light source, the reflector having the reflective surface for reflecting light from the light source and converging the light to a forward converging point, the projection lens which is disposed in front of the light source and used for projecting the light of the light source reflected from the reflector ahead of vehicle, and the cutline-forming shade whose upper edge is substantially disposed in the focal position of the projection lens, characterized in that the dimmer shade whose front end portion is positioned closer to the reflective surface than the converging point of the reflector is disposed above the optical axis of the reflector.

Therefore, in the vehicle headlamp according to one aspect of the invention, as reflected light for forming a light-and-shade boundary portion at this end of light distribution is cut while the luminous flux density is relatively low, variation of irradiation light with respect to variation in the size and shape of the dimmer shade is small, so that delicate adjustment of the irradiation light becomes easy to make, which results in reducing the fear of lowering the visibility of a driver when the driver's eyes are moved between the light and shade portions.

According to a second aspect of the invention, because the front end portion of the dimmer shade is positioned in the vicinity of the reflective surface of the reflector, useless light can be cut while the reflective luminous flux is extremely coarse, whereby it is possible to make delicate adjustment of the light distribution and to simultaneously render light-and-shade variation on this side of light distribution slow.

According to a third aspect of the invention, because the projection lens is held by the lens holder coupled to the front end portion of the reflector and the dimmer shade is projected substantially backward from the front end portion of the lens holder, an attempt to reduce cost can be accomplished by forming the lens holder integrally with the shade.

It is contemplated that numerous modifications may be made to the headlamp configuration of the present invention without departing from the spirit and scope of the invention as defined in the following claims.

What is claimed is:

1. A vehicle headlamp comprising a light source, a reflector having a reflective surface for reflecting light from said light source and converging the light to a forward converging point, a projection lens which is disposed in front of said light source and used for projecting the light of said light source reflected from said reflector ahead of vehicle, and a cutline-forming shade whose upper edge is substantially disposed in the focal position of said projection lens, and a dimmer shade, whose front end portion is positioned closer to the reflective surface than it is to said converging point of said reflector, being disposed above the optical axis of said reflector.

2. A vehicle headlamp as claimed in claim 1, wherein the front end portion of the said dimmer shade is positioned in the vicinity of the reflective surface of said reflector.

3. A vehicle headlamp as claimed in claim 2, wherein said projection lens is held by a lens holder coupled to the front end portion of said reflector, and wherein said dimmer shade is projected substantially backward from the front end portion of said lens holder.

4. A vehicle headlamp as claimed in claim 1, wherein said projection lens is held by a lens holder coupled to the front end portion of said reflector, and wherein said dimmer shade is projected substantially backward from the front end portion of said lens holder.

5. A vehicle headlamp as claimed in claim 4, wherein at least one of said dimmer shade and said cutline-forming shade is monolithic with said lens holder.

* * * * *